United States Patent
Janapati et al.

(10) Patent No.: US 10,908,036 B2
(45) Date of Patent: Feb. 2, 2021

(54) METHOD AND APPARATUS FOR LESS DESTRUCTIVE EVALUATION AND MONITORING OF A STRUCTURE

(71) Applicant: ACELLENT TECHNOLOGIES, INC., Sunnyvale, CA (US)

(72) Inventors: Vishnuvardhan Janapati, Palo Alto, CA (US); Sang Jun Lee, Santa Clara, CA (US); Fu-Kuo Chang, Stanford, CA (US); Irene Li, Stanford, CA (US)

(73) Assignee: ACELLENT TECHNOLOGIES, INC., Sunnyvale, CA (US)

( * ) Notice: Subject to any disclaimer, the term of this patent is extended or adjusted under 35 U.S.C. 154(b) by 893 days.

(21) Appl. No.: 14/250,266

(22) Filed: Apr. 10, 2014

(65) Prior Publication Data

US 2014/0309950 A1 Oct. 16, 2014

Related U.S. Application Data

(60) Provisional application No. 61/811,664, filed on Apr. 12, 2013.

(51) Int. Cl.
  *G01L 1/16* (2006.01)
  *G01M 5/00* (2006.01)

(52) U.S. Cl.
  CPC ............. *G01L 1/16* (2013.01); *G01M 5/0033* (2013.01); *G01M 5/0066* (2013.01)

(58) Field of Classification Search
  CPC ...... G01L 1/16; G01M 5/0066; G01M 5/0033
  See application file for complete search history.

(56) References Cited

U.S. PATENT DOCUMENTS

| | | | | |
|---|---|---|---|---|
| 5,816,530 A | * | 10/1998 | Grube | B64D 47/00 244/1 R |
| 6,006,163 A | * | 12/1999 | Lichtenwalner | G01H 5/00 702/34 |
| 6,370,964 B1 | | 4/2002 | Chang et al. | |
| 7,413,919 B2 | | 8/2008 | Qing et al. | |

(Continued)

OTHER PUBLICATIONS

Choi et al., "Nondestructive damage detection in structures using changes in compliance", International Journal of Solids and Structures 42, pp. 4494-4513 (2005).*

(Continued)

*Primary Examiner* — Rehana Perveen
*Assistant Examiner* — Steven W Crabb
(74) *Attorney, Agent, or Firm* — Haley Guiliano LLP; Gregory Lundell; Jon Y. Ikegami

(57) ABSTRACT

Methods and apparatuses for monitoring a first structure at least partially according to properties of a second structure. One such method comprises determining a first relationship between a first variable and a second variable, wherein the first variable represents sizes of actual damage to the second structure, and the second variable represents sizes of simulated damage on the second structure; determining a second relationship between a third variable and a fourth variable, wherein the third variable represents sizes of simulated damage on the first structure, and the fourth variable represents values of a damage index determined for the simulated damage on the first structure; and determining an estimate of damage to the first structure according to the first and second relationships.

19 Claims, 3 Drawing Sheets

(56) References Cited

U.S. PATENT DOCUMENTS

| | | | |
|---|---|---|---|
| 2007/0265790 A1* | 11/2007 | Sealing | G01M 5/0033 702/33 |
| 2011/0040496 A1* | 2/2011 | Banerjee | G01M 5/0033 702/34 |
| 2012/0271824 A1* | 10/2012 | Goldfine | G01N 27/90 707/736 |
| 2014/0058709 A1* | 2/2014 | Machado Viana | G01M 5/0033 703/2 |
| 2014/0100832 A1* | 4/2014 | Pado | G01M 5/0066 703/6 |
| 2017/0108402 A1* | 4/2017 | Chen | G01M 5/0016 |

OTHER PUBLICATIONS

Viana, Julio C. et al., "Combining Experimental and Computed Data for Effective SHM of Critical Structural Components," IEEEEAC paper#1360 pp. 1-10 (2011) (Year: 2011).*

* cited by examiner

METHOD AND APPARATUS FOR LESS DESTRUCTIVE EVALUATION AND MONITORING OF A STRUCTURE

PRIORITY

This application claims the benefit of U.S. Provisional Patent Application No. 61/811,664, filed on Apr. 12, 2013, the entire content of which is hereby incorporated by reference.

BRIEF DESCRIPTION OF THE INVENTION

Embodiments of the invention relate generally to structural health monitoring. More specifically, embodiments of the invention relate to methods and apparatuses for the less destructive evaluation and monitoring of structures.

BACKGROUND OF THE INVENTION

Conventional structural health monitoring techniques often require the destruction or damaging of the structure to be monitored. In particular, in order to reliably characterize damage to a structure, one typically must first understand how that structure actually behaves when damaged, as it is this change of behavior that is used to detect the presence damage. For instance, damage is typically detected via a change in monitoring signals as they pass through a structure. That is, monitoring signals are altered as they pass through or reflect off damaged regions of the structure, and it is these changes which indicate the presence of damage. However, structures and damage regions are often quite complex, and an understanding of exactly how damage regions alter monitoring signals can realistically be achieved only by destructive testing: actually creating damage to a structure, then passing signals through damaged regions to record exactly how these signals are altered. Thus, while monitoring itself can be performed in nondestructive manner, some prior destructive testing is still required to translate the monitoring results into accurate detection and characterization of damage.

Such destructive testing is often undesirable. For example, destructive testing requires the actual damaging of the structure in question, which may be difficult or expensive to repair/replace. Furthermore, different sizes and orientations of damage areas alter monitoring signals differently. Accurate characterization of many different types of damage in the conventional manner thus requires studying many different damage spots of different sizes and/or orientations, which may in turn require inflicting damage to large areas of the structure, or to several different structures. The purchasing or repair of many different structures, or large portions of one structure, may result in significant time and expense taken.

SUMMARY OF THE INVENTION

Embodiments of the invention can be implemented in a number of ways, including as a method, as an apparatus, and as a computer-readable medium.

In one embodiment, a structural health monitoring method comprises: for a second structure representative of a first structure, determining a first relationship between sizes of simulated damage on the second structure and values of a damage index determined for the simulated damage. Also included is determining a second relationship between sizes of actual damage to the second structure and values of the damage index determined for the actual damage. From the first and second relationships, a third relationship is determined between the sizes of actual damage to the second structure and the sizes of simulated damage on the second structure. A fourth relationship is also determined between sizes of simulated damage on the first structure and values of the damage index determined for the simulated damage on the first structure.

The method may further include monitoring the first structure so as to determine at least one value of the damage index for actual damage to the first structure; and substituting the at least one value of the damage index for actual damage to the first structure for the corresponding values of the damage index determined for the simulated damage of the fourth relationship, so as to determine corresponding values of the sizes of simulated damage on the first structure. Also included may be substituting the corresponding values of the sizes of simulated damage on the first structure for the corresponding values of the sizes of simulated damage on the second structure of the third relationship, so as to determine corresponding values of the sizes of actual damage to the second structure, and so as to thereby approximate the corresponding values of the sizes of actual damage to the second structure as one or more sizes of the actual damage to the first structure.

The simulated damage on the second structure may comprise damage simulators of differing sizes, each coupled to the second structure. The simulated damage on the first structure may comprise damage simulators of differing sizes, each coupled to the first structure.

The damage simulators may comprise rigid devices each having a first elongated flat side having a first length representing a length of a simulated crack, the flat side having a pointed end representing a tip of the simulated crack.

The first relationship may be a first curve fit to the sizes of simulated damage on the second structure; the second relationship may be a second curve fit to the sizes of actual damage to the second structure; the third relationship may be a third curve fit to the sizes of actual damage to the second structure; and the fourth relationship may be a fourth curve fit to the sizes of simulated damage on the first structure.

At least one of the first, second, third, and fourth curves may be a first degree polynomial.

At least one of the first, second, third, and fourth curves may be a power curve.

The method may further comprise determining a minimum size from among the sizes of simulated damage on the first structure, the minimum size being a threshold damage size below which a corresponding size of actual damage to the first structure is disregarded.

In another embodiment, a method of monitoring a first structure at least partially according to properties of a second structure may comprise: determining a first relationship between a first variable and a second variable, wherein the first variable represents sizes of actual damage to the second structure, and the second variable represents sizes of simulated damage on the second structure. The method may also include determining a second relationship between a third variable and a fourth variable, wherein the third variable represents sizes of simulated damage on the first structure, and the fourth variable represents values of a damage index determined for the simulated damage on the first structure; and determining an estimate of damage to the first structure according to the first and second relationships.

The determining an estimate of damage to the first structure may further comprise: approximating values of the damage index determined from a monitoring of the first structure as corresponding values of the fourth variable, so as to determine from the second relationship corresponding values of the third variable; approximating the corresponding values of the third variable as corresponding values of the second variable, so as to determine from the first relationship corresponding values of the first variable; and approximating the corresponding values of the first variable as sizes of actual damage to the first structure.

The simulated damage on the second structure may comprise damage simulators of differing sizes, each coupled to the second structure; and wherein the simulated damage on the first structure comprises damage simulators of differing sizes, each coupled to the first structure.

The damage simulators may comprise rigid devices each having a first elongated flat side having a first length representing a length of a simulated crack, the flat side having a pointed end representing a tip of the simulated crack.

The method may further comprise determining a minimum size from among the sizes of simulated damage on the first structure, the minimum size being a threshold damage size below which a corresponding size of actual damage to the first structure is disregarded.

In another embodiment, a structural health monitoring system for monitoring a first structure at least partially according to properties of a second structure comprises: a controller; and one or more memories storing data corresponding to a first relationship between a first variable and a second variable, and a second relationship between a third variable and a fourth variable. The first variable represents sizes of actual damage to the second structure, and the second variable represents sizes of simulated damage on the second structure. The third variable represents sizes of simulated damage on the first structure, and the fourth variable represents values of a damage index determined for the simulated damage on the first structure. The controller is configured to determine an estimate of actual damage to the first structure according to the stored data corresponding to the first and second relationships.

The controller may be further configured to: approximate values of the damage index determined from a monitoring of the first structure as corresponding values of the fourth variable, so as to determine from the second relationship corresponding values of the third variable; approximate the corresponding values of the third variable as corresponding values of the second variable, so as to determine from the first relationship corresponding values of the first variable; and approximate the corresponding values of the first variable as sizes of actual damage to the first structure.

The one or more memories may further store a minimum size from among the sizes of simulated damage on the first structure, the minimum size being a threshold damage size below which a corresponding size of the estimated actual damage to the first structure is disregarded.

In another embodiment, one or more non-transitory computer-readable memories collectively store data and collectively further store instructions for carrying out a method. The data comprises data corresponding to a first relationship between a first variable and a second variable, and a second relationship between a third variable and a fourth variable; and the method comprises determining an estimate of actual damage to the first structure according to the stored data corresponding to the first and second relationships. The first variable represents, for a first structure representative of a second structure, sizes of actual damage to the second structure, and the second variable represents sizes of simulated damage on the second structure. The third variable represents sizes of simulated damage on the first structure, and the fourth variable represents values of a damage index determined for the simulated damage on the first structure.

The method may further comprise: approximating values of the damage index determined from a monitoring of the first structure as corresponding values of the fourth variable, so as to determine from the second relationship corresponding values of the third variable; approximating the corresponding values of the third variable as corresponding values of the second variable, so as to determine from the first relationship corresponding values of the first variable; and approximating the corresponding values of the first variable as sizes of actual damage to the first structure.

The data may further comprise data corresponding to a minimum size from among the sizes of simulated damage on the first structure, the minimum size being a threshold damage size below which a corresponding estimated size of actual damage to the first structure is disregarded.

BRIEF DESCRIPTION OF THE DRAWINGS

For a better understanding of embodiments of the invention, reference should be made to the following detailed description taken in conjunction with the accompanying drawings, in which.

Like reference numerals refer to corresponding parts throughout the drawings. The Figures are not necessarily to scale.

DETAILED DESCRIPTION OF EMBODIMENTS OF THE INVENTION

In one embodiment, a method and apparatus is given which allows for accurate monitoring and damage characterization without requiring damage to the structure in question. More specifically, embodiments of the invention acquire information about how the structure is affected by damage, without first damaging the structure. A coupon, or replica of the structure, is subjected to both simulated and actual damage instead. In addition, damage simulators are applied to the real structure. The performance of the coupon when subjected to damage (both real and simulated), as well as the performance of the real structure with simulated damage, is used to infer the performance of the real structure when undergoing actual damage.

Figure 1A:
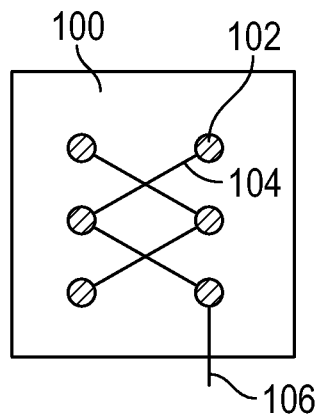
FIGS. 1A-1C illustrate an exemplary sensor system that can be used in conjunction with embodiments of the present invention.

Embodiments of the invention can employ any sensors, such as piezoelectric (PZT) transducer s capable of both generating and detecting stress waves in a structure. For purposes of illustration, one exemplary sensor system is shown in FIG. 1A, which shows a flexible sensing layer that can be used in accordance with embodiments of the present invention. A diagnostic layer 100 is shown, which contains an array of sensors 102. The sensors 102 can be any sensors capable of generating and receiving signals used in structural health monitoring such as stress waves, and are connected to conductive traces 104. The traces 104 connect (or interconnect, if necessary) sensors 102 to one or more output leads 106 configured for connection to a processor or other device capable of analyzing the data derived from the sensors 102.

Figure 1B:
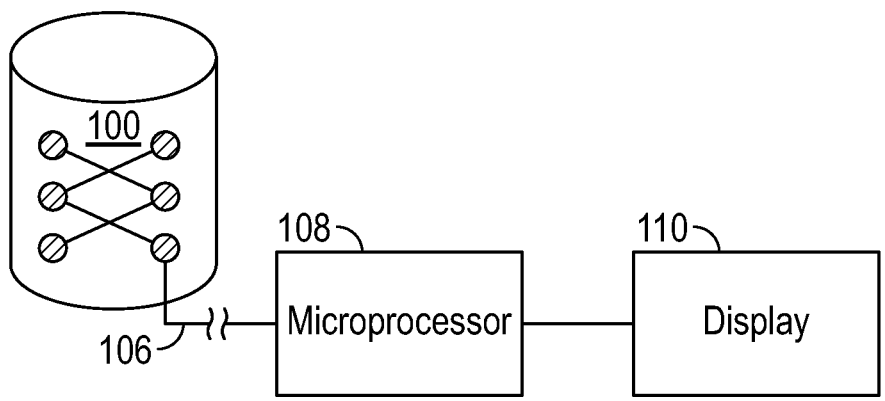

The diagnostic layer 100 and its operation are known, and are further described in U.S. Pat. No. 6,370,964 to Chang et al., which is hereby incorporated by reference in its entirety and for all purposes. Construction of the diagnostic layer 100 is also explained in U.S. Pat. No. 7,413,919 to Qing et al., which is also incorporated by reference in its entirety and for all purposes. It should be noted that the present invention is not limited to the embodiments disclosed in the aforementioned U.S. Pat. No. 7,413,919, but instead encompasses the use of flexible sensor layers having any configuration. For illustration, FIG. 1B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess various aspects of the health of the structure. For instance, detected stress waves can be analyzed to detect crack propagation within the structure, delamination within composite structures, or the likelihood of fatigue-related failure. Quantities such as these can then be displayed to the user via display 110.

Figure 1C:
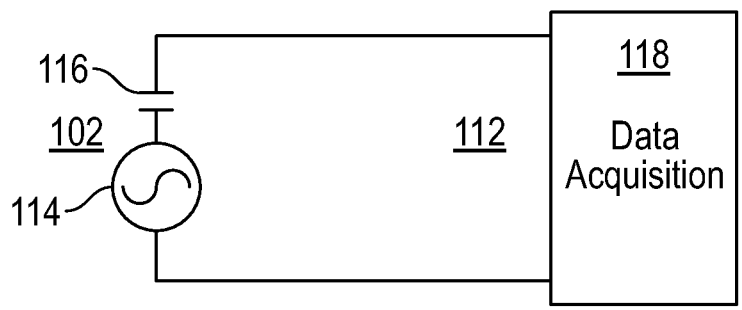

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. These piezoelectric transducers can also act as actuators, converting an applied voltage to a stress wave signal.

Figure 2:
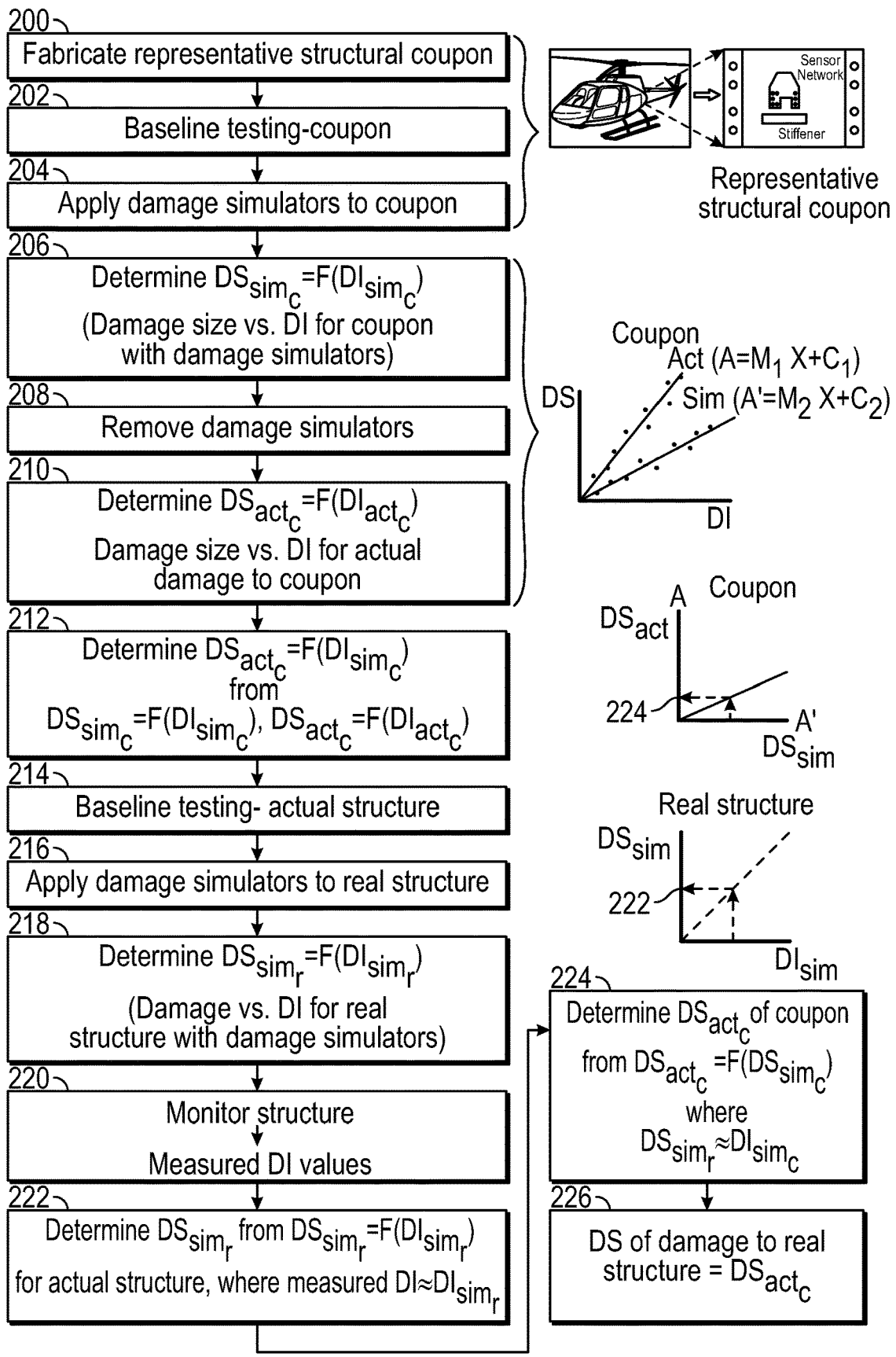
FIG. 2 is a flowchart illustrating process steps taken in accordance with embodiments of the present invention.

The diagnostic layer 100 can be used to gather data for both the coupon and real structure, in accordance with the methods of embodiments of the invention. FIG. 2 is a flowchart illustrating process steps taken in accordance with embodiments of the present invention. Here, the process starts by fabricating a representative structural "coupon" (Step 200). The coupon is a simulation of a particular part of the "real" structure that is to be monitored. For example, say the "real" structure of interest is a helicopter, as shown at the top of FIG. 2. In particular, the area to be monitored is a portion of the helicopter's tail, as shown. The coupon would then be a mock-up or simulation of that portion of the tail, made of the same or similar materials and having similar shape, dimensions, and features. It would therefore have the same or similar structural properties, and damage to the coupon would thus likely exhibit the same or similar characteristics as the same damage inflicted upon the real structure (i.e., the helicopter).

It is desirable to have baseline information on the undamaged state of the structure, so that any detected changes in the structure can be compared to determine the extent of any damage. Accordingly, monitoring signals such as stress waves can be propagated through the undamaged structure by certain sensors 102, and subsequently detected by other sensors 102. The characteristics of the detected stress waves thus indicate what the monitoring signals look like after they have propagated through the undamaged structure. They thus can be considered baseline signals, representative of a baseline or undamaged state of the structure. Characteristics of these signals can therefore be stored as baseline signal information, and used as a reference point. Later signals can be compared to these baseline signals, where differences from baseline signals indicate a change in the structure such as damage.

Accordingly, a diagnostic layer 100 is attached to the coupon, and baseline testing of various locations on the coupon is then performed (Step 202). This baseline testing can include propagating stress waves through locations of the coupon, detecting the propagated stress waves at sensors 102 of diagnostic layer 100, and storing the detected waveforms as baseline signals. Embodiments of the invention contemplate the use of any type and shape of signals, sent from any suitable signal generator, and the storage of the resulting detected waveforms in any manner for comparison to subsequent monitoring signals.

Next, damage simulators are applied to the coupon, to simulate damage thereto (Step 204). Damage simulators are known, and one type of damage simulator suitable for use with embodiments of the invention is further described below in connection with FIG. 3. Damage simulators typically represent damage of a particular size and shape, such as a crack of a particular length. Accordingly, damage simulators can be placed at any locations on the coupon where damage to the corresponding real structure may be expected to occur. For instance, damage simulators representing cracks may be placed and oriented radially outward from a screw hole, or placed to represent cracks emanating from a notch or other stress concentrator. Embodiments of the invention contemplate the placement of damage simulators of any size, at any location on a coupon, so that the signals corresponding to any kind of simulated damage may be recorded and used in monitoring for real damage.

Once the damage simulators are placed in appropriate locations and orientations on the coupon, the change in the coupon's characteristics due to the simulated damage is determined (Step 206). In particular, the diagnostic layer 100 generates stress waves, or monitoring signals, within the structure, where they are detected by certain sensors 102 after the waves pass through regions occupied by the damage simulators. The sensors 102 are preferably located in the same positions as those that collected baseline information, for accurate comparison of data.

The detected stress waves are then compared to the stored baseline stress wave shapes determined from Step 202, with differences between the detected stress waves and the baseline stress waves representing the degree of damage due to the sizes and orientations of the damage simulators used. This comparison can be performed in any manner that can be used in subsequent damage detection. One such approach involves determining values of a damage index DI from the signal comparisons, and plotting the corresponding damage simulator size values on a graph of damage size versus DI. That is, for each individual damage simulator, stress waves are passed through that particular region of the coupon, and the resulting detected stress waves are compared to previously-determined baseline stress waveforms for that same region of the coupon without the damage simulator. A DI value is then determined from this comparison, and the process is repeated for each damage simulator. Successive tests can be performed for a single location on the coupon, with the previous simulator removed and a differently-sized simulator applied for each test. For multiple damage simulators of different sizes, this results in a graph of damage size versus DI for simulated damage to one location on the coupon. Multiple such locations can be tested in this manner, to produce a graph for each location on the coupon.

Embodiments of the invention contemplate the determination of DI values in any manner. One nonlimiting example involves determining DI values according to the following:

$$\text{Ndmg\_sig} = \frac{\text{c\_sig}}{\sqrt{\sum (\text{c\_sig}^2)}} \quad (1)$$

$$\text{Nref\_sig} = \frac{\sum (\text{b\_sig} \times \text{Ndmg\_sig})}{\sum (\text{b\_sig}^2)} \times \text{b\_sig}$$

$$\text{Damage Index}(DI) = \sum (\text{Ndmg\_sig} - \text{Nref\_sig})^2$$

where
b_sig=baseline signal
c_sig=detected signal.

The DI values calculated from Equations (1) can be plotted along with their corresponding damage simulator sizes to produce a graph of damage size versus DI, which represents damage size as a function of DI for simulated damage to the coupon (Step 206). This function can be seen as the lower curve of the topmost graph of FIG. 2, i.e. curve SIM in the uppermost graph of FIG. 2. The function can be determined as a curve fit to the corresponding data points. As shown, a linear curve $A^I = m_2 x + c_2$ may be fit to the data points, where A is damage size, m is the slope of the line, c is the y-axis intercept, and x is the damage index. Alternatively, any nonlinear curve, such as power curve $A = a(x/b)^c$ or any other power law expression, may be fit to the data points, or the data points themselves may be used instead of a curve fit, where intermediate values may be found by interpolation.

Once the SIM curve $A^I$ is determined for various locations on the coupon, the damage simulators are removed from the coupon (Step 208). The process of Step 206 is then repeated without the damage simulators, and with actual damage applied to the coupon. That is, the coupon is damaged, and a plot of damage size versus DI for actual damage to the coupon is determined (Step 210). More specifically, actual damage is inflicted upon the coupon, in the same locations and having the same damage sizes and orientations as represented by the damage simulators. The diagnostic layer 100 then passes stress waves through the areas of actual damage, which alters the stress waves. These altered stress waves are then detected by certain ones of the sensors 102, and the resulting waveforms, along with the corresponding stored baseline waveforms are used to determine DI values using Equations (1), for each location. The resulting DI values and their corresponding actual damage sizes are plotted on the same graph as that for Step 206, to produce a plot of damage size versus DI for actual damage to the coupon. A curve such as the linear curve $A = m_1 x + c_1$ shown can then be fit to this plot, similar to the $A^I$ curve determined in Step 206. The result of steps 206 through 210 is, for a particular coupon location, a curve SIM representing damage size as a function of DI for simulated damage to the coupon, and a curve ACT representing damage size as a function of DI for actual damage to the coupon.

The SIM and ACT curves for the various coupon locations are then used to determine a curve of size of actual damage to the coupon versus the size of simulated damage to the coupon at each location (Step 212). For each DI value, the corresponding damage size values of the SIM and ACT curves are plotted on a graph of damage size of actual damage ($DS_{ACT}$) vs. damage size of simulated damage ($DS_{SIM}$). The resulting curve, or collection of data points, represents the relationship between actual damage size and simulated damage size for the coupon. That is, for each size of simulated damage to a particular location on the coupon, how much larger (or smaller) the corresponding actual damage to the coupon will be. This relationship is represented by the graph to the right of Step 212 in FIG. 2.

Baseline testing of the actual structure to be monitored is then performed (Step 214). This baseline testing can be performed in similar manner to that of Step 202, such as by applying a diagnostic layer 100 to the actual structure so that sensors 102 are located in corresponding locations as those placed on the coupon during Step 202. Stress waveforms are then passed through various portions of the actual structure, received at various sensors 102, and stored to serve as baseline waveforms for particular locations on the real structure. As above, signals from subsequent monitoring of the actual structure can then be compared to these stored baseline waveforms, with differences indicating changes, such as damage, to particular locations on the structure.

Once baseline waveforms have been acquired and stored, damage simulators are then applied to the actual structure (Step 216). These damage simulators are of the same size as those used in Step 204, and are placed in the same locations and orientations as those placed on the coupon in Step 204. The actual structure is then tested to determine its response to simulated damage (Step 218). The sensors 102 generate stress waveforms within the structure, and also detect these same stress waves after they have propagated through the areas occupied by the damage simulators. The detected stress waves and the stored baseline waveforms of Step 214 are then used in connection with Equations (1) to determine plots of damage size versus DI for simulated damage to locations on the actual structure. That is, the relationship between damage size and DI is determined for simulated damage to locations on the actual structure. This is represented, for one location, by the graph to the right of Step 218 in FIG. 2. A curve can be fit to the relationship of Step 218, similar to the ACT and SIM curves, and/or the curve of Step 212, above. Also as above, this curve can be any curve, linear or otherwise. Alternatively, no curve need be fitted to the data.

The relations resulting from Steps 212 and 218, e.g. the curves shown in the graphs to the right of Steps 212 and 218 in FIG. 2, are then used in real-time monitoring of the actual structure to detect the occurrence of damage thereto. The damage simulators are removed from the actual structure, and at any subsequent time, the structure can be monitored to detect the possible presence of damage (Step 220). This monitoring can be at any time, e.g. during, before, or after operation, or the like. The diagnostic layer 100 is employed to transmit the same stress waveforms through the structure once again, and Equations (1) are used to determine, from the resulting detected stress waveforms and stored baseline waveform data, DI values corresponding to the current state of the actual structure.

These DI values are then used to determine corresponding damage size values according to the relation from Step 218, e.g., the graph exemplified to the right of Step 218 in FIG. 2 (Step 222). More specifically, the graph of Step 218 describes the relationship between damage size and damage index for simulated damage to the real structure. By assuming that the measured DI values from Step 220 are approximately equal to the same DI values determined from simulated damage to the real structure, the graph of Step 218 can then be used to determine corresponding simulated damage size values for that same structure. Put another way, if damage index values determined for simulated damage to the real structure are designated as $DI_{SIM_R}$ and the size of simulated damage to the real structure is designated as $DS_{SIM_R}$, then the graph of Step 218 can be expressed as $DS_{SIM_R} = f(DI_{SIM_R})$, where measured $DI \approx DI_{SIM_R}$.

The $DS_{SIM_R}$ values determined at Step 222 are then used to determine corresponding actual damage size values according to the relation from Step 212, e.g., the graph exemplified to the right of Step 212 in FIG. 2 (Step 224). As above, the graph of Step 212 describes the relationship between actual damage size and simulated damage size for the coupon. By assuming that the values of simulated damage size for the real structure that were determined at Step 222 are approximately equal to the corresponding values of simulated damage size for the coupon, the relation of Step 212 can be used to determine the size of actual damage which corresponds to the simulated damage determined at Step 222. In other words, if damage size values determined for simulated damage to the coupon are designated as $DS_{SIM_C}$, and the size of actual damage on the coupon is designed as $DS_{ACT_C}$, then the relation of Step 212 used here can be expressed as $DS_{ACT_C} = f(DS_{SIM_C})$, where $DS_{SIM_R} \approx DS_{SIM_C}$.

The result of Step 224 is a set of damage sizes, $DS_{ACT_C}$, corresponding to the measured DI values determined from the real structure. By assuming that damage to the real structure has the same properties as damage of the same size and orientation applied to the coupon, the size of damage to the coupon can be approximated as the size of the damage done to the real structure (Step 226). That is, the $DS_{ACT_C}$ values determined by the above process are good approximations of the actual damage to the real structure.

In summary, embodiments of the invention determine two relationships. The first is the relationship between simulated and actual damage size for the coupon, i.e. for the coupon, the size of actual damage that any given simulated damage size represents. The second is the relationship between simulated damage size and simulated damage index for the real structure, i.e. for the real structure, the simulated damage size corresponding to a particular DI value. Essentially, the real structure is analyzed to determine the relationship between DI and corresponding simulated damage size, and the coupon is analyzed to determine the relationship between simulated damage size and actual damage size. If the sizes of simulated damage applied to the real structure are the same as the sizes of simulated damage applied to the coupon, then the output of the second relationship is equal to the input of the first relationship. Accordingly, the two relationships together create a relationship between damage index values for simulated damage to the real structure, and the size of actual damage to the coupon. Therefore, by assuming that measured damage index values for actual damage to the structure are approximately equal to the corresponding DI values for simulated damage to the real structure (i.e. that simulated damage to the real structure influences stress waveforms in the same manner as actual damage to the real structure), and by further assuming that the coupon responds to damage in the same manner as the real structure, the damage size predicted by the two relationships is an accurate prediction of the size of the actual damage to the real structure. This allows the two relationships to serve as a mathematical function of sorts, with the input being DI values measured from the real structure, and the output being the size of corresponding damage. The two relationships thus allow for real-time damage assessment, with the processor 108 measuring DI values for the real structure, and the relationships determining a corresponding damage size.

It should be noted that the only actual damage done to any structure in the formulating of the above two relationships is damage done to the coupon, at Step 210. The real structure itself is not damaged—rather, only simulated damage is applied. The real structure is used to determine the relationship between DI and simulated damage size, while the coupon is used to determine the relationship between simulated damage size and actual damage size. Accordingly, embodiments of the invention allow for damage to the real structure to be characterized without requiring any actual damage to the real structure. The only actual damage is to the coupon, a replica of a portion of the structure. In this manner, characterization of the real structure can be accomplished in less destructive fashion. This in turn may result in significant savings of time and money, as no repairs need be made to the structure, and the coupon may typically be fabricated quicker and cheaper, and may simply be disposed of after testing.

Figure 3:
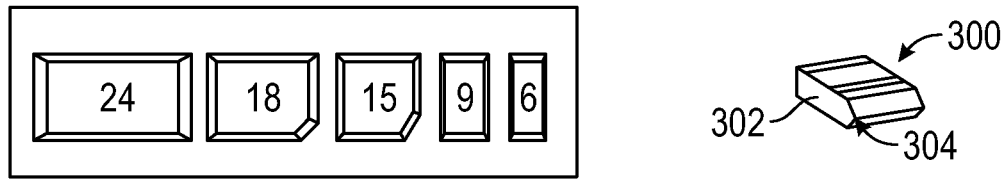
FIG. 3 illustrates a conceptual damage simulator and actual damage simulators constructed in accordance with embodiments of the present invention.

It should also be noted that the methods and apparatuses of embodiments of the invention can use, and be applied to, many different structures. As one example, FIG. 2 illustrates methods of the invention applied to a helicopter tail, with the corresponding coupon being sized and shaped as the portion of the tail that is of interest. The coupon would thus be made of the same material, e.g. aircraft aluminum or steel, and having the same thickness and curvature as the tail. The coupon would also have rivets or bolts located in the same locations as those on the tail. As another example, many different damage simulators may be used. Embodiments of the invention contemplate any damage simulator capable of accurately simulating damage to a structure. FIG. 3 illustrates one such exemplary damage simulator. Here, a damage simulator 300 has a metallic, wedge like or elongated body with a substantially flat face 302 that can be applied to a structure such as by a removable adhesive. In this example, damage simulator 300 is configured to simulate a crack. As such, it has a pointed end 304 simulating a crack tip, and the face 302 is generally linear and elongated to simulate the overall shape of a crack. FIG. 3 also shows examples of different-sized damage simulators, to be used for simulating different-sized cracks. The simulated crack length is written in mm on an upper face of each damage simulator.

The damage simulator 300 can be removably applied to the surface of a structure, such as with a removable adhesive. Any adhesive is contemplated, although AquaBond® 55 can be used as one example. When applied to the surface of a structure (such as a real structure or its corresponding coupon), the damage simulator 300 constrains the surface of the structure, altering any stress waves that may pass through that region of the structure's surface in a manner similar to that of an actual crack. Other geometries, materials, and types of damage simulators 300 are contemplated for simulation of other types of damage.

Figure 4:
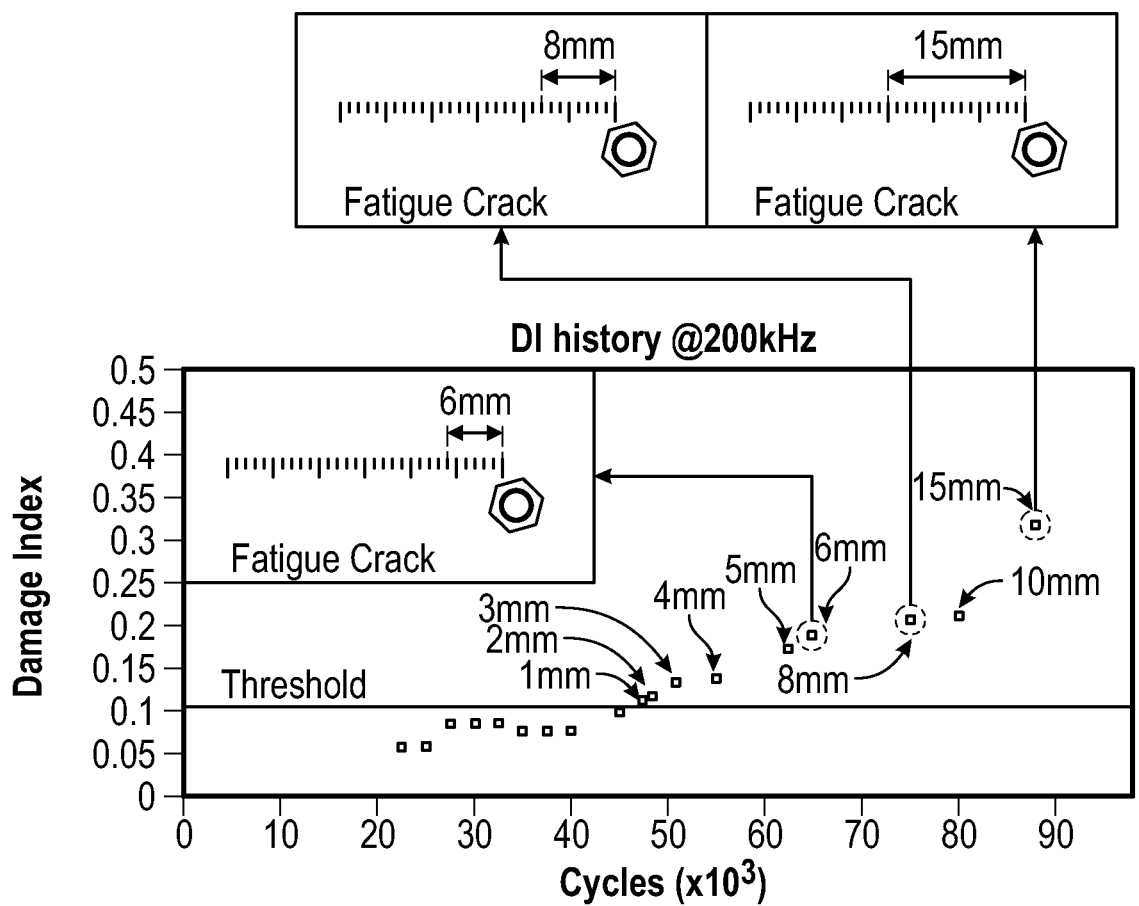
FIG. 4 is a graph conceptually illustrating threshold determination in accordance with embodiments of the present invention.

One of ordinary skill in the art will also realize that the above described process can be modified in any manner. For example, the process can include the determination of a minimum damage size, or threshold value below which damage is not determined. That is, at Step 222, if it is determined that the detected DI value corresponds to a size of damage that is below the threshold value, the corresponding damage is considered to be too small to be of concern, and disregarded, so that the process can stop at Step 222, or alternatively may continue but with the final results being discarded. The determination of this threshold value may be made in any manner. For instance, the real structure or the coupon may be tested to determine the size at which damage begins to be of concern, as decided in any manner. FIG. 4 illustrates one such example of threshold damage size determination. Here, damage is assumed to be a fatigue crack, with the coupon subjected to fatigue testing until fatigue cracks are produced. Crack length as a function of fatigue cycles is shown in the graph of FIG. 4. From this graph, it can be seen that crack length (as measured by corresponding DI value) remains relatively stable until approximately 45K cycles, at which point the crack begins to grow. Accordingly, the threshold value is set at the critical crack length beyond which cracks tend to grow with further stress cycles. This point is shown as the dotted line in FIG. 4, corresponding to a crack size of just less than 1 mm and a damage index value of just over 0.1. In operation then, any measured DI values resulting in a $DS_{SIM_R}$ value below this threshold number can be disregarded.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any relationships between damage index and damage size are contemplated, and these relationships can be of any form. As nonlimiting examples, the relationships can be any function fit to the corresponding data, such as any linear or nonlinear function. The relationship can simply be a set of data points, with intermediate values determined by interpolation or by any other suitable manner if desired. Any coupon type and geometry is contemplated, so long as it is representative of its corresponding real structure. Likewise, any damage simulator is contemplated, of any material and geometry, for simulating any type of damage. The embodiments were chosen and described in order to best explain the principles of the invention and its practical applications, to thereby enable others skilled in the art to best utilize the invention and various embodiments with various modifications as are suited to the particular use contemplated. The various features of the disclosed embodiments and examples may be mixed and matched in any manner or combination to form further embodiments contemplated by the invention.

What is claimed is:

1. A method of estimating damage to a structure without damaging the structure, the method comprising:
for a second physical structure representative of a first physical structure, receiving a first relationship between sizes of first physical simulations of damage, the first physical simulations coupled to the second physical structure, and values of a damage index determined from measurements of the second physical structure having the physical simulations coupled thereto;
receiving a second relationship between sizes of actual damage to the second physical structure and values of the damage index determined for the actual damage;
receiving a third relationship between the sizes of actual damage to the second physical structure and the sizes of simulated damage on the second physical structure, the third relationship determined according to the first and second relationships;
receiving a fourth relationship between sizes of simulated damage on the first physical structure and values of the damage index determined for the simulated damage on the first physical structure, the simulated damage on the first physical structure corresponding to second physical simulations of damage coupled to the first physical structure;
using sensors of a structural health monitoring system, detecting an occurrence of damage to the first physical structure;
using the structural health monitoring system, determining an estimate of the damage to the first physical structure, the estimate determined according to the third and fourth relationships; and
displaying the estimate of the damage so as to relay a characterization of the detected damage to the first physical structure.

2. The method of claim 1, wherein the determining an estimate of damage further comprises:
monitoring the first structure so as to determine at least one value of the damage index for actual damage to the first physical structure;
substituting the at least one value of the damage index for actual damage to the first physical structure for the corresponding values of the damage index determined for the simulated damage of the fourth relationship, so as to determine corresponding values of the sizes of simulated damage on the first physical structure; and
substituting the corresponding values of the sizes of simulated damage on the first physical structure for the corresponding values of the sizes of simulated damage on the second physical structure of the third relationship, so as to determine corresponding values of the sizes of actual damage to the second physical structure, and so as to thereby approximate the corresponding values of the sizes of actual damage to the second physical structure as one or more sizes of the actual damage to the first physical structure.

3. The method of claim 1, wherein the first physical simulations of damage comprise damage simulators of differing sizes, each coupled to the second physical structure; and wherein the simulated damage on the first physical structure comprises damage simulators of differing sizes, each coupled to the first physical structure.

4. The method of claim 3, wherein the damage simulators comprise rigid devices each having a first elongated flat side having a first length representing a length of a simulated crack, the flat side having a pointed end representing a tip of the simulated crack.

5. The method of claim 1, wherein:
the first relationship is a first curve fit to the sizes of simulated damage on the second physical structure;
the second relationship is a second curve fit to the sizes of actual damage to the second physical structure;

the third relationship is a third curve fit to the sizes of actual damage to the second physical structure; and the fourth relationship is a fourth curve fit to the sizes of simulated damage on the first physical structure.

6. The method of claim 5, wherein at least one of the first, second, third, and fourth curves is a first degree polynomial.

7. The method of claim 5, wherein at least one of the first, second, third, and fourth curves is a power curve.

8. The method of claim 1, further comprising determining a minimum size from among the sizes of simulated damage on the first physical structure, the minimum size being a threshold damage size below which a corresponding size of actual damage to the first physical structure is disregarded.

9. A method of monitoring a first physical structure at least partially according to properties of a second physical structure so as to estimate damage to the first physical structure without damaging the first physical structure, the method comprising:

determining a first relationship between a first variable and a second variable, wherein the first variable represents sizes of actual damage to the second physical structure, and the second variable represents sizes of simulated damage on the second physical structure as determined from measurements of the second physical structure while the second physical structure has first physical simulations of damage coupled thereto;

determining a second relationship between a third variable and a fourth variable, wherein the third variable represents sizes of simulated damage on the first physical structure, the simulated damage on the first physical structure corresponding to second physical simulations of damage coupled to the first physical structure, and the fourth variable represents values of a damage index determined for the simulated damage on the first physical structure;

using sensors of a structural health monitoring system, detecting an occurrence of damage to the first physical structure;

using the structural health monitoring system, determining an estimate of the damage to the first physical structure, the estimate determined according to the first and second relationships; and displaying the estimate of the damage so as to relay a characterization of the detected damage to the first physical structure.

10. The method of claim 9, wherein the determining an estimate of damage to the first physical structure further comprises:

approximating values of the damage index determined from a monitoring of the first physical structure as corresponding values of the fourth variable, so as to determine from the second relationship corresponding values of the third variable;

approximating the corresponding values of the third variable as corresponding values of the second variable, so as to determine from the first relationship corresponding values of the first variable; and approximating the corresponding values of the first variable as sizes of actual damage to the first structure.

11. The method of claim 9, wherein the simulated damage on the second physical structure comprises damage simulators of differing sizes, each coupled to the second physical structure; and wherein the simulated damage on the first physical structure comprises damage simulators of differing sizes, each coupled to the first structure.

12. The method of claim 11, wherein the damage simulators comprise rigid devices each having a first elongated flat side having a first length representing a length of a simulated crack, the flat side having a pointed end representing a tip of the simulated crack.

13. The method of claim 9, further comprising determining a minimum size from among the sizes of simulated damage on the first physical structure, the minimum size being a threshold damage size below which a corresponding size of actual damage to the first physical structure is disregarded.

14. A structural health monitoring system for monitoring a first physical structure at least partially according to properties of a second physical structure so as to estimate damage to the first physical structure without damaging the first physical structure, the system comprising:

a plurality of sensors;

a microcontroller configured for electrical communication with the sensors; and one or more memories storing data corresponding to a first relationship between a first variable and a second variable, and a second relationship between a third variable and a fourth variable; wherein the first variable represents sizes of actual damage to the second physical structure, and the second variable represents sizes of simulated damage on the second physical structure as determined from measurements of the second physical structure while the second physical structure has first physical simulations of damage coupled thereto;

wherein the third variable represents sizes of simulated damage on the first physical structure, the simulated damage on the first physical structure corresponding to second physical simulations of damage coupled to the first physical structure, and the fourth variable represents values of a damage index determined for the simulated damage on the first physical structure; and wherein the microcontroller is configured to detect an occurrence of actual damage to the first physical structure from the sensors, to determine an estimate of the actual damage to the first physical structure according to the stored data corresponding to the first and second relationships, and to display the estimate so as to relay a characterization of the detected damage to the first physical structure.

15. The system of claim 14, wherein the microcontroller is further configured to:

approximate values of the damage index determined from a monitoring of the first physical structure as corresponding values of the fourth variable, so as to determine from the second relationship corresponding values of the third variable;

approximate the corresponding values of the third variable as corresponding values of the second variable, so as to determine from the first relationship corresponding values of the first variable; and approximate the corresponding values of the first variable as sizes of actual damage to the first physical structure.

16. The system of claim 14, wherein the one or more memories further store a minimum size from among the sizes of simulated damage on the first physical structure, the minimum size being a threshold damage size below which a corresponding size of the estimated actual damage to the first physical structure is disregarded.

17. One or more non-transitory computer-readable memories, the memories collectively storing data and collectively further storing computer executable instructions for carrying out a method:

the data comprising data corresponding to a first relationship between a first variable and a second variable, and a second relationship between a third variable and a fourth variable; and the method comprising:
- detecting, using sensors of a structural health monitoring system, an occurrence of actual damage to a first physical structure;
- determining an estimate of the actual damage to the first physical structure according to the stored data corresponding to the first and second relationships; and
- using the structural health monitoring system, generating for display the estimate of the actual damage to the first physical structure so as to relay a characterization of the detected actual damage to the first physical structure;

wherein the first variable represents, for the first physical structure being representative of a second physical structure, sizes of actual damage to the second physical structure, and the second variable represents sizes of simulated damage on the second physical structure as determined from measurements of the second physical structure while the second physical structure has first physical simulations of damage coupled thereto;

wherein the third variable represents sizes of simulated damage on the first physical structure, the simulated damage on the first physical structure corresponding to second physical simulations of damage coupled to the first physical structure, and the fourth variable represents values of a damage index determined for the simulated damage on the first physical structure.

18. The memories of claim 17, wherein the method further comprises:
- approximating values of the damage index determined from a monitoring of the first physical structure as corresponding values of the fourth variable, so as to determine from the second relationship corresponding values of the third variable;
- approximating the corresponding values of the third variable as corresponding values of the second variable, so as to determine from the first relationship corresponding values of the first variable; and
- approximating the corresponding values of the first variable as sizes of actual damage to the first physical structure.

19. The memories of claim 17, wherein the data further comprises data corresponding to a minimum size from among the sizes of simulated damage on the first physical structure, the minimum size being a threshold damage size below which a corresponding estimated size of actual damage to the first physical structure is disregarded.

* * * * *